United States Patent
McCoy et al.

(10) Patent No.: US 6,777,947 B2
(45) Date of Patent: Aug. 17, 2004

(54) SENSOR CABLE

(75) Inventors: Kenneth Ferrell McCoy, Redwood City, CA (US); Robert Stephen Wasley, San Carlos, CA (US)

(73) Assignee: Tyco Thermal Controls LLC., Redwood City, CA (US)

( * ) Notice: Subject to any disclaimer, the term of this patent is extended or adjusted under 35 U.S.C. 154(b) by 0 days.

(21) Appl. No.: 10/134,232

(22) Filed: Apr. 29, 2002

(65) Prior Publication Data

US 2003/0201781 A1 Oct. 30, 2003

(51) Int. Cl.$^7$ ................................................ G01M 3/04
(52) U.S. Cl. ................ 324/449; 324/73.1; 73/40.5 R; 73/40
(58) Field of Search ................. 324/73.1, 525, 324/425, 439, 444, 447, 448, 449, 722, 92, 94, 539, 543; 73/40.5 R, 40, 61.41; 138/104, 137; 340/605

(56) References Cited

U.S. PATENT DOCUMENTS

| | | | |
|---|---|---|---|
| 4,404,516 A | 9/1983 | Johnson, Jr. | 324/54 |
| 4,570,477 A | 2/1986 | Sugibuchi | 73/40.5 R |
| 4,843,327 A | 6/1989 | Koppitsch et al. | 324/525 |
| 4,877,923 A | 10/1989 | Sahakian | 174/11 R |
| 4,918,977 A | 4/1990 | Takahashi et al. | 73/40.5 R |
| 4,922,183 A | 5/1990 | Kamas | 324/694 |
| 4,926,129 A | 5/1990 | Wasley et al. | 324/555 |
| 4,926,165 A | 5/1990 | Lahlouh et al. | 340/603 |
| 4,931,741 A | 6/1990 | Koppitsch et al. | 324/525 |
| 5,015,958 A | 5/1991 | Masia et al. | 324/522 |
| 5,177,996 A | 1/1993 | Sahakian | 73/40 |
| 5,191,292 A | 3/1993 | Klotz et al. | 324/446 |
| 5,203,202 A | 4/1993 | Spencer | 73/40.5 R |
| 5,235,286 A | 8/1993 | Masia et al. | 324/522 |
| 5,313,823 A | 5/1994 | Berkman et al. | 73/40 |
| 5,381,097 A | 1/1995 | Takatori et al. | 324/512 |
| 5,382,909 A | 1/1995 | Masia et al. | 324/522 |
| 5,918,267 A | 6/1999 | Evans et al. | 73/40.5 R |

FOREIGN PATENT DOCUMENTS

EP 0 558 057 9/2003

*Primary Examiner*—N. Le
*Assistant Examiner*—Vincent Q. Nguyen
(74) *Attorney, Agent, or Firm*—William F. Dee; Elizabeth A. O'Brien

(57) ABSTRACT

A cable suitable for detecting the presence of corrosive liquids is disclosed. In an embodiment the cable includes two sensing wires wrapped around a core member, at least one of the sensing wires being surrounded by a non-conductive surface layer. In an alternate embodiment the cable includes two sensing wires wrapped around a core member, the sensing wires and core member being encapsulated by a non-conductive surface layer. Preferably, the cable includes insulating wires for detecting the location of a leak. When a corrosive liquid contacts the sensing wires of the cable an electrical connection is created between them.

10 Claims, 2 Drawing Sheets

1

SENSOR CABLE

FIELD OF THE INVENTION

This invention relates to cables for sensing the presence of a corrosive liquid.

BACKGROUND OF THE INVENTION

Transporting liquids such as crude oil, refined petroleum products, or corrosive liquids such as concentrated acids or bases is often accomplished utilizing tanks and underground pipelines. Underground pipelines are subject to leakage from the piping, fittings, and valves. When an underground pipe carrying a hazardous or corrosive liquid develops a leak, the leak must first be detected and located before it can be repaired.

Various systems for detecting leaks are well-known. For example, sensor cables may be used to detect changes in variables along an elongate path, such as the presence of a liquid such as water, an organic solvent, or a corrosive liquid. Sensor cables may be extended in a pipeline, along the length or longitudinal axis or at various sections or points at which the leakage of liquids tends to occur.

Known sensor cables generally comprise first and second conductors spaced apart from one another. If an electrically conductive liquid contacts both the first and second conductors, an electrical connection is made. If there is not enough liquid present to create contact between the first and second conductors there will be no connection. Conventional sensor cables will detect any conductive liquid, including rainwater and groundwater. Therefore, these sensor cables are subject to false alarms since such conventional sensor cables are not capable of differentiating between common conductive liquids such as ground water or rainwater containing mild concentrations of corrosive components and conductive, highly corrosive, liquids such as concentrated sulfuric acid, hydrochloric acid, nitric acid, acetic acid, strong mineral acids, or strong bases such as sodium hydroxide.

It is an object of this invention to provide a cable particularly suitable for detecting the location of a leak.

It is a further object of this invention to provide a method of detecting and locating the presence of a leak utilizing the cable of the present invention.

SUMMARY OF THE INVENTION

The present invention relates to a cable particularly suitable for detecting corrosive liquids and for detecting and locating leaks and a method of using the cable. In more detail the cable of the current invention comprises first and second sensing wires and a core member around which the first and second sensing wires are wrapped. Further, each sensing wire comprises a center conductor and at least one conductive layer. At least one of the sensing wires further comprises at least one non-conductive surface layer. The cable may further comprise insulating wires to assist in determining the exact location of the leak.

An alternate embodiment of the cable comprises first and second sensing wires and a core member around which the first and second sensing wires are wrapped. The first and second sensing wires and the core member are encapsulated by at least one non-conductive surface layer. The cable may further comprise insulating wires to assist in determining the exact location of the leak.

The cables of the present invention may be useful as part of an electrical circuit to detect the location of leaks. The present invention also relates to a method of using the cables to detect and locate the presence of a leak.

DETAILED DESCRIPTION OF THE INVENTION

Figure 1:
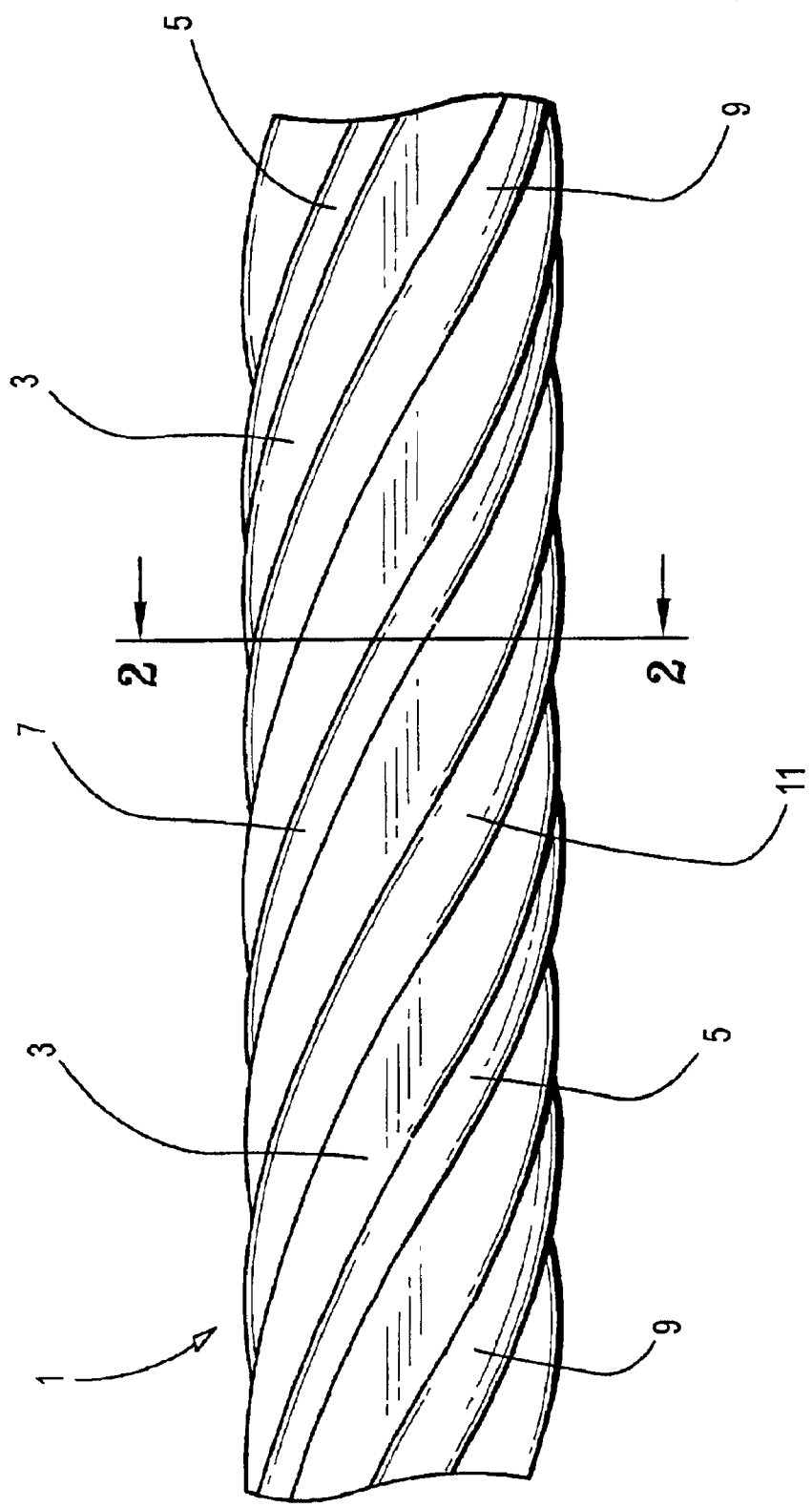
FIG. 1 is a plan view of a cable of the current invention.

The present invention relates to a cable particularly suitable for detecting corrosive liquids and for detecting and locating leaks and a method of using the cable. In more detail the cable of the current invention comprises first and second sensing wires and a core member around which the first and second sensing wires are wrapped. Further, each sensing wire comprises a center conductor and at least one conductive layer. At least one of the sensing wires further comprises at least one non-conductive surface layer. The cable may further comprise insulating wires to assist in determining the exact location of the leak.

An alternate embodiment of the cable comprises first and second sensing wires and a core member around which the first and second sensing wires are wrapped. The first and second sensing wires and the core member are encapsulated by at least one non-conductive surface layer. The cable may further comprise insulating wires to assist in determining the exact location of the leak.

The cables of the present invention may be useful as part of an electrical circuit to detect the location of leaks. The present invention also relates to a method of using the cables to detect and locate the presence of a leak.

In more detail the cable comprises first and second sensing wires and a core member around which the first and second sensing wires are wrapped. Each of the first and second sensing wires of the cable comprise a center conductor and at least one conductive layer. The center conductor of each sensing wire is comprised of any metal, such as a solid or stranded metal wire or metal braid made from copper, nickel, tin-plated copper, metal alloys comprised of nickel and copper, or other suitable material. The at least one conductive layer of the sensing wire surrounds the center conductor and is in contact with the center conductor. Preferably, each sensing wire comprises one conductive layer. The conductive layer not only acts as an electrical conductor but also as a protective layer to prevent corrosion to the center conductor of the sensing wire upon exposure to liquids. The conductive layer is formed from a conductive composition which comprises a polymeric matrix in which is dispersed a particulate conductive filler. Any conductive polymer composition may be used. For many applications it is preferred that the polymer be selected for its solvent and chemical resistance to materials with which it may come in contact. A useful polymer is polyvinylidene fluoride. Any suitable conductive filler may be used, for example carbon black, graphite, metal, metal oxide, particles of conductive polymer, or a mixture thereof. In addition, the conductive polymer composition may contain inert fillers, crosslinking agents, plasticizers, lubricants, or other process aids. The appropriate resistivity level of the composition will vary depending on the application, but is preferably in the range of 0.1 to 50,000 ohm-cm, more particularly 1 to 1,000 ohm-cm, most preferably 1 to 250 ohm-cm.

At least one of the first and second sensing wires further comprises at least one non-conductive surface layer. Preferably, both the first and second sensing wires have at least one non-conductive surface layer. More preferably, each of the first and second sensing wires comprise only one non-conductive layer. The at least one non-conductive surface layer surrounds the at least one conductive layer and is in contact with the conductive layer. The non-conductive surface layer is any material, preferably polymeric, that is dissolved or solubilized in corrosive liquids contained in the pipeline. The non-conductive surface layer is not dissolved or solubilized in conductive liquids such as rainwater or groundwater. The selection of non-conductive surface layers is dependent on the application and type of leak to be detected. For example, it is known that many commercially available grades of polyurethanes dissolve upon contact with concentrated sulfuric acid. Preferably, the at least one non-conductive surface layer is selected from commercially available polyamides and polyurethanes. Exemplary polyurethanes include Type 4-20630 and Type 4-20538, produced and sold by Dymax Corporation, Torrington, Conn.

The core member of the cable has an outer surface comprising a deformable insulating material. The deformable material may be a thermoplastic, for example polyvinylidene fluoride, or an elastomer, for example thermoplastic elastomer (TPR), or a blend of materials depending on the physical and thermal properties desired for the application. For many applications it is desirable that the core member also comprise a central support member that is surrounded by the deformable material. The central support member provides physical reinforcement of the core member. The central support member comprises a center conductor and at least one insulating polymeric layer. The center conductor is comprised of any metal, such as a solid or stranded metal wire or metal braid made from copper, nickel, tin-plated copper, metal alloys, or other suitable material. If the central support member is conductive, as in the case of a wire, the central support member can be used as part of an electrical circuit to detect faults or breaks in one of the sensing wires or any other components.

The first and second sensing wires may be the same or different in composition, construction, and size. Depending on the application, the size of the center conductor of the sensing wire and the thickness of the conductive and non-conductive polymer layers of the sensing wires may vary. In order to have adequate flexibility, it is preferred that the outer diameter of the first and the second sensing wires be 0.005 to 0.500 inch (0.0127 to 1.27 cm), preferably 0.020 to 0.200 inch (0.051 to 0.508 cm), more preferably 0.025 to 0.100 inch (0.064 to 0.254 cm), most preferably 0.025 to 0.060 inch (0.064 to 0.152 cm).

In an alternate embodiment of the invention the cable comprises first and second sensing wires and a core member around which the first and second sensing wires are wrapped and the wires and core member are encapsulated by at least one non-conductive layer. Each of the first and second sensing wires of the cable comprises a center conductor and at least one conductive layer. The center conductor of each sensing wire is comprised of any metal, such as a solid or stranded metal wire or metal braid made from copper, nickel, tin-plated copper, metal alloys, or other suitable material. The at least one conductive layer of the sensing wire surrounds the center conductor and is in contact with the center conductor. Preferably, each sensing wire comprises one conductive layer. This conductive layer not only acts as an electrical conductor but also as a protective layer to prevent corrosion to the center conductor of the sensing wire upon exposure to liquids. For purposes of this invention a conductive layer is formed from a conductive composition which comprises a polymeric matrix in which is dispersed a particulate conductive filler. Any conductive polymer composition may be used. For many applications it is preferred that the polymer be selected for its solvent and chemical resistance to materials with which it may come in contact. A useful polymer is polyvinylidene fluoride. Any suitable conductive filler may be used, for example carbon black, graphite, metal, metal oxide, particles of conductive polymer, or a mixture thereof. In addition, the conductive polymer composition may contain inert fillers, crosslinking agents, plasticizers, lubricants, or other process aids. The appropriate resistivity level of the composition will vary depending on the application, but is preferably in the range of 0.1 to 50,000 ohm-cm, more preferably 1 to 1,000 ohm-cm, most preferably 1 to 250 ohm-cm.

The first and second sensing wires together with the core member are encapsulated by at least one non-conductive surface layer. The non-conductive surface layer is any material, preferably polymeric, that is dissolved or solubilized in corrosive liquids contained in the pipeline. The non-conductive surface layer is not dissolved or solubilized by conductive liquids such as rainwater or groundwater. The selection of non-conductive surface layers is dependent on the application and type of leak to be detected. For example, it is known that many commercially available grades of polyurethanes dissolve upon contact with concentrated sulfuric acid. Preferably, the at least one non-conductive surface layer is selected from commercially available polyamides and polyurethanes. Exemplary polyurethanes include Type 4-20630 and Type 4-20538, produced and sold by Dymax Corporation, Torrington, Conn.

The core member of the cable has an outer surface comprising a deformable insulating material. The deformable material may be a thermoplastic, for example polyvinylidene fluoride, or an elastomer, for example thermoplastic elastomer (TPR), or a blend of materials depending on the physical and thermal properties desired for the application. For many applications it is desirable that the core member also comprise a central support member that is surrounded by the deformable material. This central support member provides physical reinforcement of the core member. The central support member comprises a center conductor and at least one insulating polymeric layer. The center conductor is comprised of any metal, such as a solid or stranded metal wire or metal braid made from copper, nickel, tin-plated copper, metal alloys, or other suitable material. If the central support member is conductive, as in the case of a wire, the central support member can be used as part of an electrical circuit to detect faults or breaks in one of the sensing wires or any other components.

The first and second sensing wires may be the same or different in composition, construction, and size. Depending on the application, the size of the metal center conductor of the sensing wire and the thickness of the conductive and non-conductive polymer layers of the sensing wires may vary. In order to have adequate flexibility, it is preferred that the outer diameter of the first and the second sensing wires be 0.005 to 0.500 inch (0.0127 to 1.27 cm), preferably 0.020 to 0.200 inch (0.051 to 0.508 cm), more preferably 0.025 to 0.100 inch (0.064 to 0.254 cm), most preferably 0.025 to 0.060 inch (0.064 to 0.152 cm).

The cables of the described embodiments can be produced in the following manner. The first sensing wire is positioned in a first channel of the core member. The first channel, which may be of any suitable shape, partially surrounds the first sensing wire and allows exposure of the first sensing wire to a liquid. At least one, and preferably two, first shoulders extend outwardly beyond the first sensing wire to an extent that the first sensing wire will not protrude from the channel. The extent to which the shoulder protrudes beyond the first sensing wire is preferably from 0.002 to 0.020 inch (0.005 to 0.051 cm).

The second sensing wire is positioned in a second channel in the core member of the cable in the same manner as that of the first sensing wire. At least one, and preferably two, shoulders extend outwardly beyond the second sensing wire to protect the second sensing wire. The dimensions of the second sensing wire and the second channel may be the same or different from those of the first sensing wire and first channel.

The first and second sensing wires are applied in a generally spiral path along the length of the cable and are wrapped around the core member. In this specification, the term "spiral" means any form of progression of the sensing wire down the length of the cable, whether the pitch is constant or varies, and whether the progression is regular or irregular. If the outer surface of the core member is heated to a temperature sufficient to deform the deformable material, when the first and second sensing wires are wrapped around the core member, they become embedded into the deformable material and form first and second channels. This technique, in which the conductor "carves" the channel, allows the conductors to be positioned securely within each channel and prevents them from sliding out. In a preferred construction, the positions of the first and second sensing wires are balanced, that is the cable can be bent equally easily in any direction. For many embodiments, the first and second sensing wires are equidistant from the central axis of the conductor. Thus if the core member has a generally circular shape, the first sensing wire and the second sensing wire are on opposite sides of the core member diameter rather than adjacent to one another.

For some applications, it is useful to determine the exact location of the leak. For this purpose one can utilize one or more insulating wires in combination with the cable comprising first and second sensing wires and a core member. By the use of the proper electronic components connected to the first and second sensing wires and to one or more insulating wires, the exact location of the electrical connection produced at the site of the leak can be determined. The insulating wires comprise a central wire which is surrounded by an insulating material such as a polymer. A first, as well as a second, insulating wire can be wrapped around the core member of the cable separately or at the same time as the one or both of the first and second sensing wires are wrapped around the core member. Alternatively, if the central support member is an insulated wire, it can be used in place of one of the first and second insulating wires. It is preferred that the first and second insulating wires are balanced, that is they form part of a symmetrical cable, equally spaced from one another and from each of the first and second sensing wires. A preferred embodiment is a four wire system in which a first insulating wire acts as a return wire to a voltage meter and a second insulating wire acts as an auxiliary wire. Suitable electronics and methods of detecting the location of a leak are well-known.

The invention is illustrated by the drawing in which FIG. 1 shows a plan view of a cable 1. A core member 3 is wrapped in a spiral pattern with a first sensing wire 5, a first insulating wire 9, a second sensing wire 7, and a second insulating wire 11.

Figure 2:
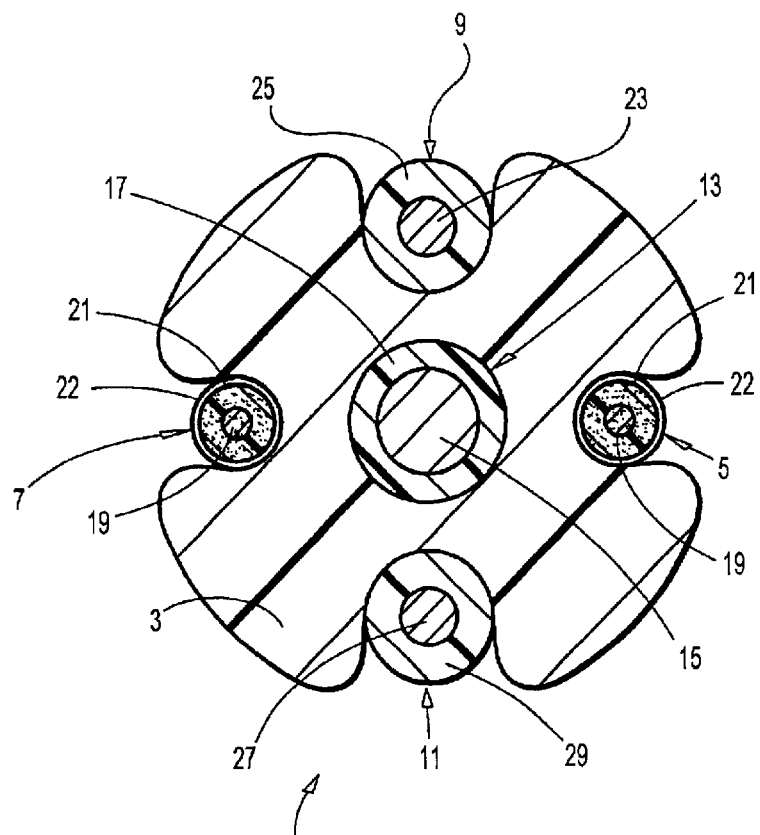
FIG. 2 is a cross-sectional view of a cable of the current invention along line 2—2 of FIG. 1.

FIG. 2 is a cross-sectional view of the cable 1 along line 2—2 of FIG. 1. In this embodiment, polyvinylidene fluoride comprises the core member 3 and surrounds a central support member 13 which comprises a stranded nickel-plated copper wire center conductor 15 and an insulating ethylene/tetrafluoroethylene copolymer layer 17. The first sensing wire 5 and second sensing wire 7 are embedded into the core member 3. Each sensing wire 5,7 comprises a center conductor 19 of solid Alloy 294 wire (produced and sold by American Wire Corporation, Sandy Hook, Conn.) surrounded by a carbon-filled polyvinylidene fluoride layer 21, which is surrounded by a layer of non-conductive polyurethane 22. The first insulating wire 9 comprises a solid tin-plated copper center wire 23 surrounded by an insulating layer of polyvinylidene fluoride 25 and the second insulating wire 11 comprises a solid tin-plated copper center wire 27 surrounded by an insulating polymer layer of polyvinylidene fluoride 29.

Figure 3:
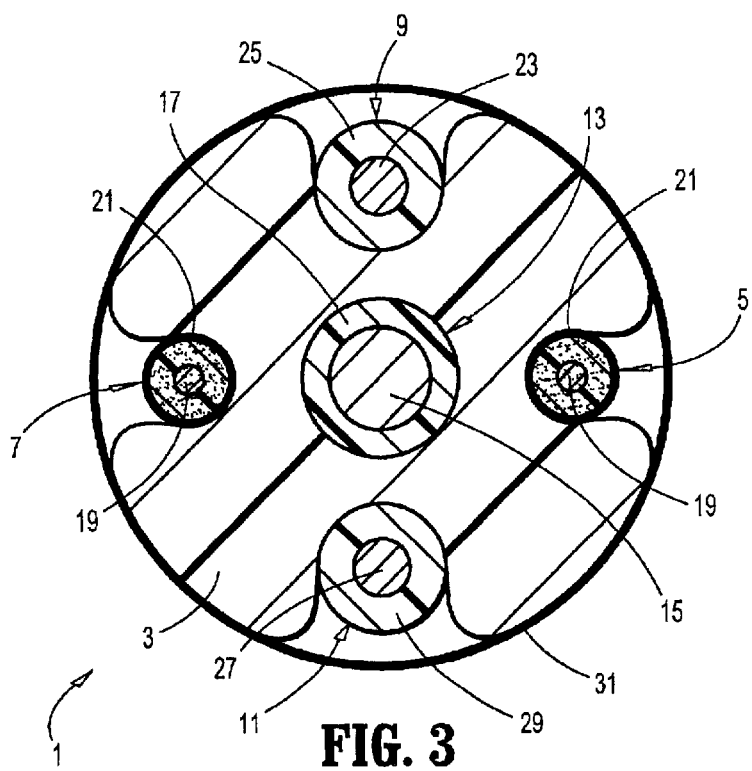
FIG. 3 is a cross-sectional view of an alternate embodiment cable of the current invention along line 2—2 of FIG. 1.

FIG. 3 is a cross-sectional view of a cable 1 according to an alternate embodiment. In this embodiment, polyvinylidene fluoride comprises the core member 3 and surrounds a central support member 13 which comprises a stranded nickel-plated copper wire center conductor 15 and an insulating polymeric layer 17 made from ethylene/tetrafluoroethylene copolymer. The first sensing wire 5 and second sensing wire 7 are embedded into the core member 3. Each sensing wire 5,7 comprises a center conductor 19 made from solid Alloy 294 wire, surrounded by a carbon-filled polyvinylidene fluoride layer 21. The first insulating wire 9 comprises a solid tin-plated copper center wire 23 surrounded by an insulating layer of polyvinylidene fluoride 25 and the second insulating wire 11 comprises a center wire 27 surrounded by an insulating layer of polyvinylidene fluoride 29. A non-conductive layer of polyurethane 31 surrounds core member 3, first sensing wire 5, second sensing wire 7, first insulating wire 9, and second insulating wire 11.

The cables of the described invention may be used to determine the presence and location of a leak in the following manner. A cable made according to the described invention is extended along the length of a pipeline carrying a corrosive liquid. Whenever corrosive liquid contained within the pipeline leaks, the corrosive liquid contacts the cable and a non-conductive surface layer of the cable, upon contact with the corrosive liquid, is dissolved or solubilized, exposing an underlying conductive layer of the cable.

In an embodiment, which is preferred, the non-conductive surface layer of each of the first and second sensing wires of the cable, upon contact with the corrosive liquid, is dissolved or solubilized, exposing an underlying conductive layer of each of the first and second sensing wires. Once the conductive layers of each sensing wire are exposed and in contact with the corrosive liquid an electrical connection is made between the first and second sensing wires. The resulting electrical connection indicates the presence of a leak. If insulating wires are included then the location of the leak is also determined.

In an alternate embodiment of a cable of the invention, the non-conductive surface layer encapsulating the core member and the first and second sensing wires, upon contact with the corrosive liquid, is dissolved or solubilized, exposing the conductive layer of each of the first and second sensing wires. Once the conductive layers of each sensing wire are exposed and in contact with the corrosive liquid an electrical connection is made between the first and second sensing wires. The resulting electrical connection indicates the presence of a leak. If insulating wires are included then the location of the leak is also determined.

EXAMPLE 1

A sensing wire was prepared by extruding a layer of carbon-filled polyvinylidene fluoride (0.011 inch/0.028 cm) over a first 30 AWG (0.010 inch/0.025 cm diameter) solid Alloy 294 wire conductor. A second sensing wire was prepared in the same manner. An insulating wire was prepared by extruding a layer of polyvinylidene fluoride over a 24 AWG (0.025 inch/0.064 cm diameter) solid tin-plated copper wire to give an outer diameter of approximately 0.054 inch (0.137 cm). A second insulating wire was prepared in the same manner. The polymer layers of the sensing wires and the insulating wires were then irradiated to 10 to 15 Mrad. The sensing wires were then dip coated in non-conductive polyurethane. Each of the sensing wires having a non-conductive surface layer had an outer diameter of approximately 0.036 inch (0.091 cm).

A central support member was prepared by extruding two layers of ethylene/tetrafluoroethylene copolymer to a total of 0.008 inch (0.020 cm) over a 16 AWG (0.060 inch/0.152 cm) diameter stranded nickel-plated copper wire to give an outer diameter of approximately 0.077 inch (0.196 cm). Using a 1.5 inch (3.8 cm) extruder, a core member was prepared by extruding an 0.060 inch (0.152 cm) layer of thermoplastic elastomer (TPR™ 5490, produced and sold by BP Performance Polymers) over the central support member. The resulting core member had an outer diameter of 0.195 to 0.201 inch (0.495 to 0.511 cm). The plastic of the core member was softened by passing the core member through a 3-foot (91 cm) long radiant heater heated to 580° C. at a rate of 9 to 10 feet/min (2.74 to 3.05 m/min). The softened core member then traveled 2.5 feet (76 cm) through ambient air before entering a wrapping head. Two sensing wires and two insulating wires were wrapped at an equal spacing (approximately 0.157 inch/0.40 cm from wire center to wire center) in a spiral pattern around the carrier rod at a pitch of about 0.400 inch (1.02 cm). The wires were wrapped in a pattern of a first sensing wire, a first insulating wire, a second sensing wire, and a second insulating wire. The tension of each wire was adjusted to a level at which each wire was forced into the softened deformable polymer of the core member to a depth sufficient to prevent any protrusion of the wire above the surface of the core member. The resulting cable had a maximum diameter of approximately 0.250 inch (0.635 cm).

EXAMPLE 2

A sensing wire was prepared by extruding a first layer of carbon-filled polyvinylidene fluoride (0.011 inch/0.028 cm) over a first 30 AWG (0.010 inch/0.025 cm diameter) solid Alloy 294 wire conductor. A second sensing wire was prepared in the same manner. An insulating wire was prepared by extruding a layer of polyvinylidene fluoride over a 24 AWG (0.025 inch/0.064 cm diameter) solid tin-plated copper wire to give an outer diameter of approximately 0.054 inch (0.137 cm). A second insulating wire was prepared in the same manner. The polymer layers of the sensing wires and insulating wires were then irradiated to 10 to 15 Mrad.

A central support member was prepared by extruding two layers of ethylene/tetrafluoroethylene copolymer to a total of 0.008 inch (0.020 cm) over a 16 AWG (0.060 inch/0.152 cm) diameter stranded nickel-plated copper wire to give an outer diameter of approximately 0.077 inch (0.196 cm). Using a 1.5 inch (3.8 cm) extruder, a core member was prepared by extruding an 0.060 inch (0.152 cm) layer of thermoplastic elastomer (TPR™ 5490, produced and sold by BP Performance Polymers) over one central support member. The resulting core member had an outer diameter of 0.195 to 0.201 inch (0.495 to 0.511 cm). The plastic of the core member was softened by passing the core member through a 3-foot (91 cm) long radiant heater heated to 580° C. at a rate of 9 to 10 feet/min (2.74 to 3.05 m/min). The softened core member then traveled 2.5 feet (76 cm) through ambient air before entering a wrapping head. Two sensing wires and two insulating wires were wrapped at an equal spacing (approximately 0.157 inch/0.40 cm from wire center to wire center) in a spiral pattern around the carrier rod at a pitch of about 0.400 inch (1.02 cm). The wires were wrapped in a pattern of a first sensing wire, a first insulating wire, second sensing wire, and a second insulating wire. The tension of each wire was adjusted to a level at which each wire was forced into the softened deformable polymer of the core member to a depth sufficient to prevent any protrusion of the wire above the surface of the core member. The cable was then dip coated in non-conductive polyurethane to encapsulate the cable. The resulting sensor cable had a maximum diameter of approximately 0.256 inch (0.650 cm).

The cables of Examples 1 and 2 are expected to be useful in determining and locating corrosive liquids and leaks of the corrosive liquids.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

We claim:

1. A cable suitable for detecting the presence of a corrosive liquid comprising:
    a) first and second sensing wires comprising a center conductor surrounded by at least one conductive layer, at least one of said first and second sensing wires further surrounded by at least one non-conductive surface layer; and
    b) a core member around which said first and second sensing wires are wrapped.

2. The cable according to claim 1 wherein said first and second sensing wires comprise at least one non-conductive surface layer.

3. The cable according to claim 1 further comprising first and second insulating wires.

4. The cable according to claim 3 wherein said first and second sensing wires and said first and second insulating wires are arranged in a balanced configuration on said core member.

5. The cable according to claim 1 wherein the core member comprises a central support member which is surrounded by an insulating material.

6. The cable according to claim 5 wherein the central support member is a wire and the insulating material is a polymer.

7. A method for detecting and locating the presence of a leak utilizing the cable of claim 1.

8. A cable suitable for detecting the presence of a corrosive liquid comprising:
    a) first and second sensing wires comprising a solid metal center conductor surrounded by a layer of conductive polyvinylidene fluoride which conductive layer is surrounded by a layer of polyurethane;
    b) a core member around which said first and second sensing wires are wrapped comprising a central support member comprised of a stranded nickel-plated copper wire surrounded by two layers of ethylene/tetrafluoroethylene copolymer surrounded by a layer of thermoplastic elastomer.

9. A cable suitable for detecting the presence of a corrosive liquid comprising:
    a) first and second sensing wires comprising a center conductor surrounded by at least one conductive layer;
    b) a core member around which said first and second sensing wires are wrapped;
    c) at least one non-conductive surface layer encapsulating said first and second sensing wires and said core member.

10. A method for detecting and locating the presence of a leak utilizing the cable of claim 9.

* * * * *